United States Patent
Clark et al.

(10) Patent No.: US 10,901,580 B2
(45) Date of Patent: *Jan. 26, 2021

(54) ASSOCIATING ANCILLARY INFORMATION WITH AN APPLICATION USER INTERFACE

(71) Applicant: International Business Machines Corporation, Armonk, NY (US)

(72) Inventors: David J. Clark, Warwick (GB); Lee M. Chase, Warwick (GB); Mark A. Farmer, Warwick (GB); Mark Gregory, Warwick (GB); Ian D. Hancock, Warwick (GB); Duncan J. Lilly, Warwick (GB); Simon E. Moore, Warwick (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/821,369

(22) Filed: Nov. 22, 2017

(65) Prior Publication Data

US 2018/0095629 A1 Apr. 5, 2018

Related U.S. Application Data

(63) Continuation of application No. 13/948,522, filed on Jul. 23, 2013, now Pat. No. 9,868,174.

(30) Foreign Application Priority Data

Aug. 13, 2012 (GB) .................................. 1214375.6

(51) Int. Cl.
*G06F 3/048* (2013.01)
*G06F 3/0484* (2013.01)
(Continued)

(52) U.S. Cl.
CPC ........ *G06F 3/0484* (2013.01); *G06F 9/44505* (2013.01); *G06F 9/451* (2018.02); *H04M 1/72569* (2013.01); *H04M 1/72583* (2013.01)

(58) Field of Classification Search
CPC ............. G06F 16/9535; G06F 3/04847; G06F 3/0485; H04L 29/06; H04L 29/06027;
(Continued)

(56) References Cited

U.S. PATENT DOCUMENTS 6,633,315 B1 10/2003 Sobeski et al.
6,744,450 B1 6/2004 Zimniewicz
(Continued)

FOREIGN PATENT DOCUMENTS

WO 200068769 A1 11/2000

OTHER PUBLICATIONS

Int'l. Appln. GB1214375.6 Search Report, dated Dec. 13, 2012, 4 pg.

(Continued)

*Primary Examiner* — Linh K Pham
(74) *Attorney, Agent, or Firm* — Cuenot, Forsythe & Kim, LLC

(57) ABSTRACT

Associating user interface elements with information ancillary to said user interface elements includes creating one or more items of user interface element ancillary information, receiving a request for user interface element ancillary information, the request identifying the context in which the information is to be used, searching, using a processor, said one or more items of user interface element ancillary information for items matching the context in which the information is to be used, and returning one or more items of user interface element ancillary information matching the context in which the information is to be used.

20 Claims, 3 Drawing Sheets

(51) Int. Cl.
*G06F 9/445* (2018.01)
*G06F 9/451* (2018.01)
*H04M 1/725* (2006.01)

(58) Field of Classification Search
CPC ........... H04N 21/4622; H04N 21/4782; H04N 21/4383; G11B 27/034; G11B 27/34
See application file for complete search history.

(56) References Cited

U.S. PATENT DOCUMENTS

| | | |
|---|---|---|
| 7,421,683 B2 | 9/2008 | Robertson et al. |
| 7,735,079 B1 | 6/2010 | Davis |
| 7,747,966 B2 | 6/2010 | Leukart |
| 7,788,606 B2 | 8/2010 | Patel |
| 8,001,470 B1 * | 8/2011 | Chen ................... G06F 9/453 715/714 |
| 8,230,417 B1 | 7/2012 | Clark |
| 9,886,174 B2 | 2/2018 | Clark et al. |
| 2002/0026443 A1 | 2/2002 | Chang |
| 2003/0025693 A1 | 2/2003 | Haley |
| 2003/0090514 A1 | 5/2003 | Cole |
| 2003/0099459 A1 | 5/2003 | Yanagita |
| 2005/0027694 A1 * | 2/2005 | Sauermann ........... G06F 16/248 |
| 2005/0055639 A1 | 3/2005 | Fogg |
| 2005/0149206 A1 | 7/2005 | Krane |
| 2005/0222989 A1 * | 10/2005 | Haveliwala ............ G06Q 30/02 |
| 2006/0149574 A1 | 7/2006 | Bradley |
| 2006/0224624 A1 * | 10/2006 | Korn ................... G06F 16/9535 |
| 2008/0244429 A1 | 10/2008 | Stading |
| 2008/0313154 A1 | 12/2008 | Wallis |
| 2009/0043799 A1 | 2/2009 | Morris |
| 2009/0240672 A1 * | 9/2009 | Costello .............. G06F 16/9535 |
| 2010/0088601 A1 | 4/2010 | Teunen et al. |
| 2010/0094803 A1 * | 4/2010 | Yamakawa ........... G06F 16/907 707/609 |
| 2010/0318743 A1 | 12/2010 | Fitzpatrick et al. |
| 2011/0010385 A1 | 1/2011 | Ridley |
| 2011/0047166 A1 | 2/2011 | Stading |
| 2012/0047018 A1 | 2/2012 | Laffey |
| 2014/0047365 A1 | 2/2014 | Clark et al. |
| 2015/0073868 A1 | 3/2015 | Garman |
| 2015/0134322 A1 | 5/2015 | Cuthbert et al. |

OTHER PUBLICATIONS

U.S. Appl. No. 13/948,522, Non-Final Office Action, dated Apr. 24, 2015, 15 pg.

U.S. Appl. No. 13/948,522, Non-Final Office Action, dated Nov. 13, 2015, 11 pg.

U.S. Appl. No. 13/948,522, Final Office Action, dated May 11, 2016, 14 pg.

U.S. Appl. No. 13/948,522, Non-Final Office Action, dated Sep. 29, 2016, 12 pg.

U.S. Appl. No. 13/948,522, Final Office Action, dated Jan. 12, 2017, 16 pg.

U.S. Appl. No. 13/948,522, Notice of Allowance, dated Sep. 29, 2017, 12 pg.

U.S. Appl. No. 13/948,522, Notice of Allowance, dated Oct. 20, 2017, 3 pg.

* cited by examiner

ASSOCIATING ANCILLARY INFORMATION WITH AN APPLICATION USER INTERFACE

CROSS-REFERENCE TO RELATED APPLICATIONS

This application claims the benefit of United Kingdom Application Number 1214375.6 filed on Aug. 13, 2012, which is fully incorporated herein by reference.

BACKGROUND

A computer user typically communicates with applications running on the computer via a user interface (UI). Referring to FIG. 1, a window 100 on a computer screen is shown. The window 100 typically has a title bar 102 where the application name is often displayed. The window 100 typically also has a number of user interface elements such as menu items 104 or push buttons (not shown in FIG. 1). A user may select a menu item 104 and a number of options associated with that menu item 104 may appear as a drop down menu 106.

Referring to FIG. 2, user interfaces 200 generally use various types of ancillary information 204 associated with elements 202 of the user interface in order to improve the user experience. Examples of such ancillary information include:

(a) Text or graphics 206 used to label and identify the user interface element.
  These text or graphics often include:
   (ii) Translations 212 into a range of languages or dialects; and
   (ii) Alternative versions 214 of graphics suitable for different displays;
(b) Context-sensitive help 208 text and hints; and
(c) Accessibility and assistive resources 210.

A known method of associating the user interface ancillary information with user interface elements is by using a fixed identifier internal to the application that is used to link a particular user interface element (e.g., menu item, push button, voice menu, etc.) 202 with a piece of user interface ancillary information (e.g., an alternative translation for the text of the user interface element, alternative graphics, context help for the item, etc.) 206. These fixed identifiers are typically allocated during product development and assigned to the user interface elements 202. User interface ancillary information 206 is then tagged with the relevant fixed identifier to associate it with the corresponding user interface elements 202.

The problems associated with this known approach include that the user interface ancillary information 206 has to be developed in close cooperation with the team developing the application, and any changes to the user interface structure require corresponding changes to the user interface ancillary information 206, that is, the user interface ancillary information 206 is liable to change, even from version to version. Another problem is that it is difficult to make additions to or to modify the user interface ancillary information 206 once an application has been distributed and installed by an end user.

The use of fixed identifiers also means that information of each type must generally be provided for every single user interface element 202, or provide only a basic and naive level of fall-back in cases where no specific match is found. For example, every item must be given help text, however trivial, or a simple fallback to help for the form or panel or the like takes place.

There is also generally no structured or integrated mechanism for user participation in modifying, updating or extending the ancillary information 206 provided for an application, and for providing feedback or requesting assistance. Similarly, there is no straightforward way for the application developers to monitor the use of the ancillary information 206 that was provided and detect problems or shortcomings.

BRIEF SUMMARY

A method of associating user interface elements with information ancillary to the user interface elements includes creating one or more items of user interface element ancillary information, receiving a request for user interface element ancillary information, the request identifying the context in which the information is to be used, and searching, using a processor, the one or more items of user interface element ancillary information for items matching the context in which the information is to be used. The method also includes returning one or more items of user interface element ancillary information matching the context in which the information is to be used.

A system includes a processor programmed to initiate executable operations. The executable operations include creating one or more items of user interface element ancillary information, receiving a request for user interface element ancillary information, the request identifying the context in which the information is to be used, and searching the one or more items of user interface element ancillary information for items matching the context in which the information is to be used. The executable operations further include returning one or more items of user interface element ancillary information matching the context in which the information is to be used.

A computer program product includes a computer readable storage medium having program code stored thereon. The program code is executable by a processor to perform a method. The method includes creating, using the processor, one or more items of user interface element ancillary information, receiving, using the processor, a request for user interface element ancillary information, the request identifying the context in which the information is to be used, and searching, using the processor, the one or more items of user interface element ancillary information for items matching the context in which the information is to be used. The method further includes returning, using the processor, one or more items of user interface element ancillary information matching the context in which the information is to be used.

BRIEF DESCRIPTION OF THE SEVERAL VIEWS OF THE DRAWINGS

Preferred embodiments of the present invention will now be described in more detail, by way of example only, with reference to the accompanying drawings, in which.

DETAILED DESCRIPTION

The present invention relates to the field of computer application user interfaces, and more particularly to associating ancillary information with computer application user interfaces.

Embodiments of the present invention provide a method of associating user interface elements with information ancillary to said user interface elements, the method comprising the steps of: creating one or more items of user interface element ancillary information; receiving a request for user interface element ancillary information, the request identifying the context in which the information is to be used; searching said one or more items of user interface element ancillary information for items matching the context in which the information is to be used; and returning one or more items of user interface element ancillary information matching the context in which the information is to be used. The method provides the advantage that the returned user interface ancillary information is not just that which exactly matches the request, but is additionally information that is associated contextually with the requested information.

Figure 1:
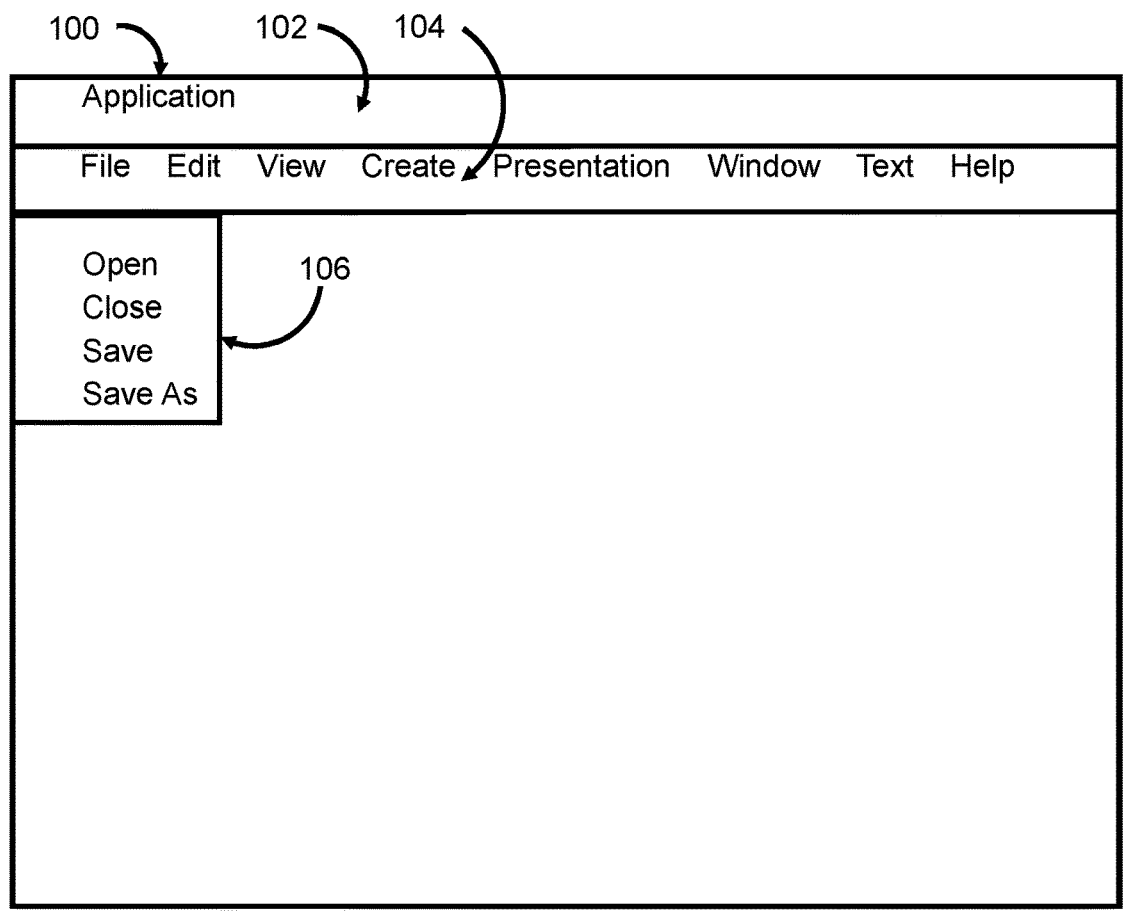
FIG. 1 shows a prior art user interface to a computer application.
Figure 2:
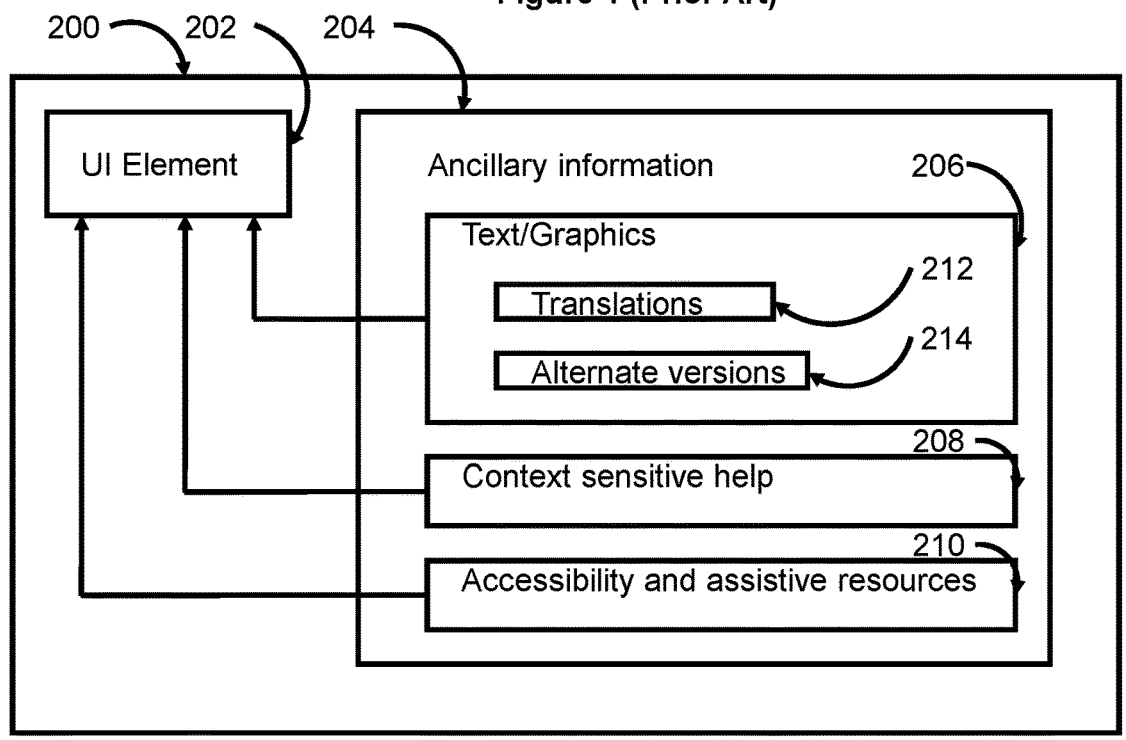
FIG. 2 shows a prior art block diagram of a user interface element and its associated ancillary information.
Figure 3:
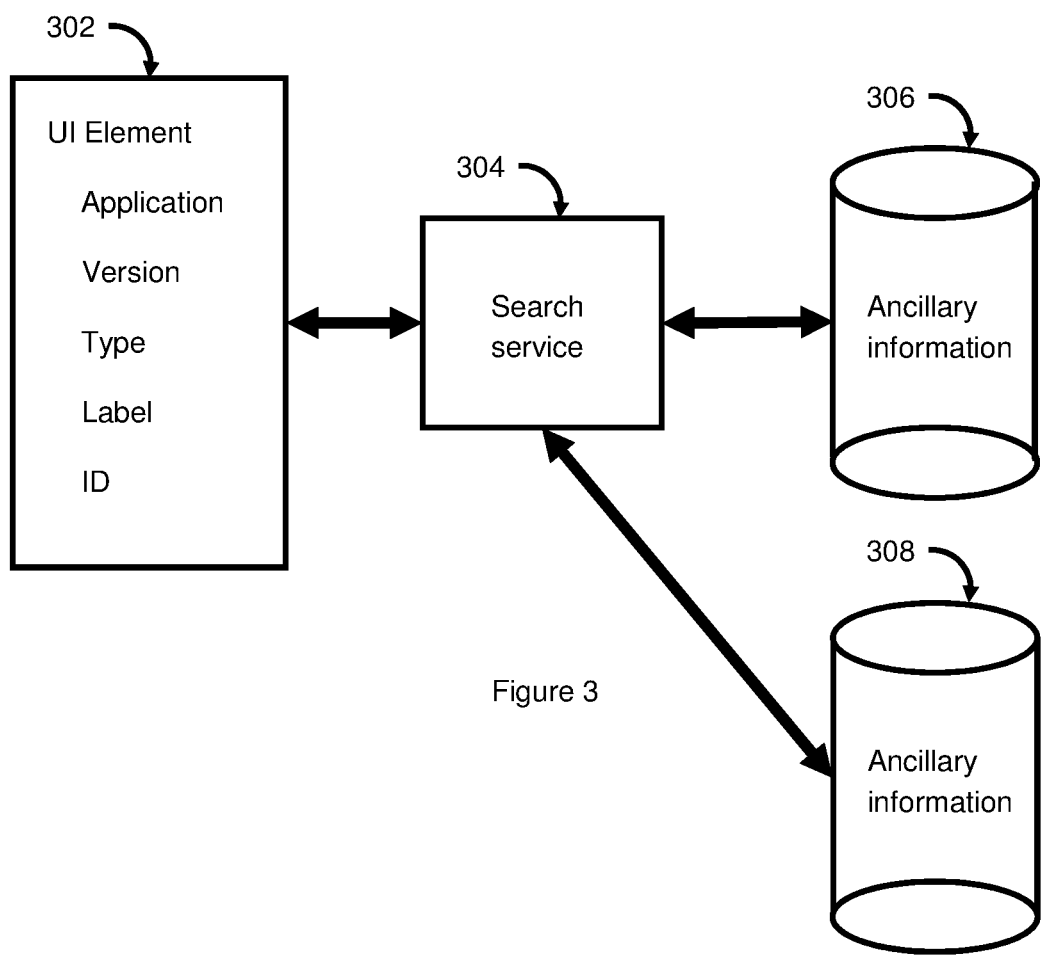
FIG. 3 shows a block diagram of an embodiment of the present invention having a user interface element, a search engine and ancillary information.

Referring to FIG. 3, a user interface element 302 is shown containing structured contextual information to describe a particular user interface feature. In the example of FIG. 3 that information includes the application name, a version identifier, the type of the user interface element, the label of the element and an ID for the element. It may contain other information, such as any current content/value or any other information which may be useful. It may omit any of the application name, a version identifier, the type of the user interface element, the label of the element and an ID for the element if desired. In particular, the ID for the element may be omitted.

One possible implementation of the user interface element 302 of FIG. 3 is an XML fragment. For a menu item to open a file, the XML fragrant may be:

```
<application>Acme Editor</application>
<version>1.5.3</version>
<UIElementType>menuitem</UIElementType>
<UIElementLabel>Open</UIElementLabel>
<UIElementID>17945</UIElementID>
```

In the example XML fragment, the application name is "Acme Editor", the version identifier is "1.5.3", the type of the user interface element is "menuitem", the label of the element is "Open" and the ID for the element is "17945". Note that the provision of an explicit ID for the user interface element is optional and is just one item of identifying information along with the other pieces of information.

Figure 4:
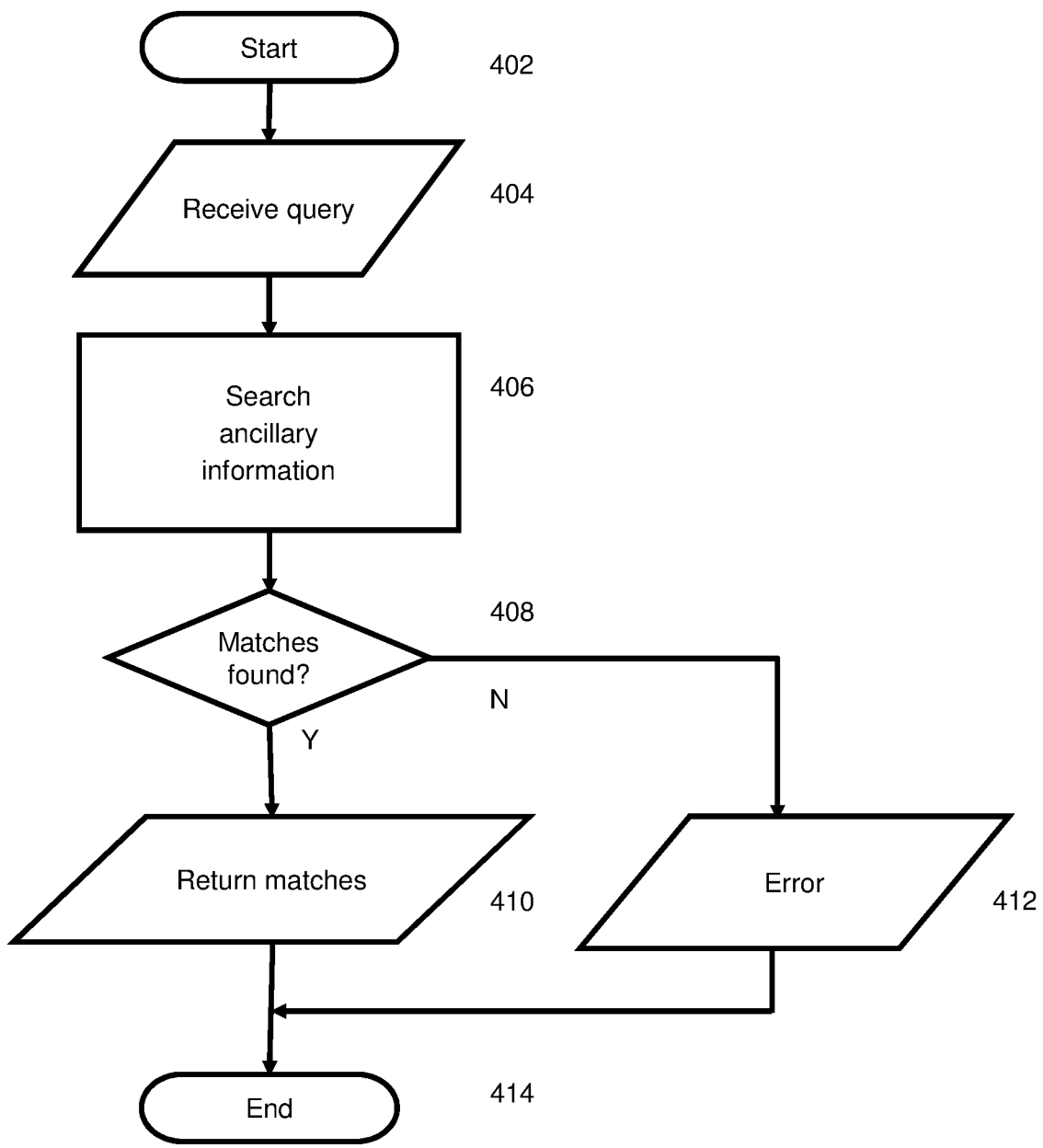
FIG. 4 shows a flow diagram of the embodiment of FIG. 3.

Referring to FIG. 4, the method of associating user interface elements with information ancillary to the user interface elements starts at step 402. At step 404, the search service 304 receives a query based on the information provided in the user interface element 302. At step 406, the search service 304 searches the repository 306 for ancillary information 204 which matches the information in the received query. Typically, a semantic search may be used by the search service 304. The input to the semantic search can include the structured contextual information described with reference to FIG. 3. At step 408, if matches are not found, then at step 412, an error is returned to the requesting application. The error may, in practice, be merely a null response. At step 408, if matches are found, then at step 410, the matches are returned to the requesting application. The returned matches are ancillary information 204 from a repository 306, 308 that matches the supplied query. The search service 304 can be requested to provide either the best match or a set of matches ranked by relevance. At step 414, the method ends.

An example implementation of the search service 304 might be a web service. The application of which the user interface element 302 is a part of POSTs the contextual information to a web service over the internet using the HTTP protocol and receives the matching ancillary information 204 from a repository 308 as a response. An alternative (or complementary) implementation of the search service 304 is as a local service, as part of the application or as part of the operating system or other environment. Such a local service receives the matching ancillary information 204 from a repository 306 as a response. Hybrid solutions are also possible, in which a local service returns matches from a local repository 306 or cache and additionally calls for results from a remote service and/or repository 308 if and when available.

The search service 304 described above is accessed via a specific communication mechanism using a particular protocol, encoding and grammar to encapsulate the contextual information described above with reference to FIG. 3 about a user interface element of the application. The search service 304 may be created and operated by the application development team, a third party commercial organization, or may be community based.

An advantage of the use of a search service 304 is that the search service 304 is able to understand and exploit the contextual information that applications provide in their requests. A search service 304 typically include one or more repositories 306 of material tagged appropriately. However, it might also access external resources 308 and secondary search services.

When a user interacts with the user interface in such a way that ancillary information 204 is required (e.g., by using 'F1' to request help on an input field, or selecting an alternative language for the user interface) then the application assembles a set of contextual information to describe the user interface feature(s) that information is required for, expressed using the specific encoding and grammar that is accepted and understood by the search service 304 that is being consulted, and sends it to the search service 304 using the appropriate protocol.

When a response is received from the search service 304, the results can be used by the application as appropriate. For example, if a suitable translation of a menu item were being requested, the best matching text could be used to replace the current or default menu item text. Similarly, if contextual help were being requested, the best matching text, or possibly a list of candidate entries, can be displayed.

The approach of FIG. 3 means that using internal fixed identifiers to relate ancillary information 204 to user interface elements 202, 302 is replaced with a more flexible and powerful approach which includes using a semantic search to perform the association between the user interface element and the ancillary information.

An advantage of this approach is that the search service 304 is not limited to finding exact matches or naive fallbacks. The search service 304 is able to apply algorithms to exploit the richer set of contextual information that is supplied. For example, if help information for a menu item were requested, the service is able to carry out any or all of the following.

It can provide help information that is specifically related to the menu item, if the menu item is found. For example, if the menu item is "Open" in a drop down menu from a "File" menu item, then help information specifically related to a "File Open" menu item could be provided.

It can provide help information for closely related user interface elements, such as the "File" menu item or the form used for input of data when the "File Open" menu item is displayed.

It can provide help information for functionally related user interface elements, such as a drop down menu elsewhere in the user interface that has a similar function. For example a menu item of "Import" under the "Text" menu item used for importing text into the current file might be regarded as having a similar function.

It can provide help information corresponding to previous versions of the application. These may be versions that a user has more familiarity with or the help information may be information that has not yet been validated as correct for the current version, but which may, nevertheless, be useful to the end user.

It can provide non-contextual information for tasks that relate to the user interface element such as how to contact the developer or supplier of the application.

It can search an index of all available help information for the application. In the example of "File Open" a list of the file formats that can be opened by the application may be provided.

It can call out to external search services such as Google, Bing and the like for free text search results and the like.

Another advantage of this approach is that the ancillary information 204 can be developed independently of the application. For example, items of help text can be added and updated without any changes to the application. This makes it practical for help text or translated text, for example, to be developed by teams that are completely independent of the team that developed the application.

The ability to add or update items of help text without any changes to the application allows for crowd-sourcing to be used to generate help text and for translations for applications. For example, wiki technology can be exploited enabling users of an application to contribute and tag their contributions in such a way that the search service can match them to user interface elements for the application.

Ancillary information 204 does not have to be provided for every single user interface element. The search engine 304 will locate the most relevant ancillary information 204. For example, if an application provides contextual help using a conventional system then help information has, in practice, to be provided for all user interface elements even if the help information is trivial. In the embodiment of FIG. 3, help need only be provided for user interface elements 204 that warrant it, and the search engine 304 returns the next most generalized or relevant help for other user interface elements 302 that did not explicitly have their own help.

The embodiment of FIG. 3 can be used to associate many types of information that are not currently contextually associated with user interface elements, for example: user tips, comments, business-specific practice guidelines, how-to videos, newsgroup threads, etc.

In an alternative embodiment, additional information can be included as part of the set of structural contextual information that is provided to the search service 304. This may include elements of the content that a user is working on, and/or elements of the recent history of a user's actions. This additional information can be used by the search service 304 to more accurately identify relevant task help and information that would be helpful for the user.

In another alternative embodiment, a user is provided with means to easily contribute to the ancillary information 204 content. For example, if a request for contextual help finds no good match, the user may read various other pieces of help text and information from other sources to answer their question. Once they have done this, the application can use the same contextual information to enable the user to generate new content and tag it appropriately so that it will then be available for future users to access via the search service 304. Similarly, the application can provide the means for the user to post a request for the missing information, or to provide feedback on the information found.

By analyzing requests made to the search service 304, it becomes possible to identify "hot spots" in an application which users often need help with. It is also possible to identify missing topics and areas of information. In a community-based search service these become opportunities for other expert users to contribute valuable content. It is also possible to identify areas of information most frequently used, languages most frequently selected, or other parameters, enabling targeting of investment for future information development.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium is any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

One or more embodiments disclosed herein can be implemented using a data processing system (system). The system can include at least one processor (e.g., a central processing unit) coupled to memory elements through a system bus or other suitable circuitry. The system can store program code within the memory elements. The processor can execute the program code accessed from the memory elements via a system bus or the other suitable circuitry. For example, the system can be implemented as a computer or other programmable data processing apparatus that is suitable for storing and/or executing program code. It should be appreciated, however, that the system can be implemented in the form of any system including a processor and memory that is capable of performing and/or initiating the functions and/or operations described within this specification.

The memory elements include one or more physical memory devices such as, for example, local memory and one or more bulk storage devices. The local memory refers to RAM or other non-persistent memory device(s) generally used during actual execution of the program code. Bulk storage device(s) can be implemented as a hard disk drive (HDD), solid state drive (SSD), or other persistent data storage device. The system also can include one or more cache memories that provide temporary storage of at least some program code in order to reduce the number of times program code must be retrieved from bulk storage device during execution.

Input/output (I/O) devices such as a keyboard, a display, and a pointing device optionally can be coupled to the system. The I/O devices can be coupled to the system either directly or through intervening I/O controllers. One or more network adapters also can be coupled to the system to enable the system to become coupled to other systems, computer systems, remote printers, and/or remote storage devices through intervening private or public networks. Modems, cable modems, wireless transceivers, and Ethernet cards are examples of different types of network adapters that can be used with the system.

What is claimed is:

1. A computer-implemented method, comprising:
receiving, from a user of a user interface element in a computer application, a request for ancillary information associated with the user interface element;
searching, within a repository and based upon the request, for previously-stored ancillary information associated with the user interface element;
identifying, based upon no previously-stored ancillary information existing for the user interface element, a best match of other ancillary information; and
returning, to the user, the other ancillary information, wherein
the request includes contextual information associated with the user interface element.

2. The method of claim 1, wherein
the ancillary information for the user interface element is received from a developer of the computer application.

3. The method of claim 1, wherein
the ancillary information for the user interface element is received from an entity independent from a developer of the computer application.

4. The method of claim 1, wherein
the searching is performed by a web service that is remote from the application.

5. The method of claim 1, wherein
the searching is performed local to the application.

6. The method of claim 1, wherein
the identifying identifies a ranked set of matches, and
the ranked set of matches are returned to the user.

7. The method of claim 1, wherein
the request is for help information associated with the user interface element.

8. The method of claim 7, wherein
the other ancillary information includes help information from a prior version of the application.

9. The method of claim 7, wherein
the other ancillary information includes help information for a functionally-related user interface element.

10. The method of claim 1, wherein
the contextual information includes one or more of
an application name,
a version identifier,
a type of the user interface element,
a label of the user interface element, and
a current content or value of the user interface element.

11. A computer hardware system, comprising
a hardware processor programmed to initiate the following executable operations:
receiving, from a user of a user interface element in a computer application, a request for ancillary information associated with the user interface element;
searching, within a repository and based upon the request, for previously-stored ancillary information associated with the user interface element;
identifying, based upon no previously-stored ancillary information existing for the user interface element, a best match of other ancillary information; and
returning, to the user, the other ancillary information, wherein
the request includes contextual information associated with the user interface element.

12. The system of claim 11, wherein
the ancillary information for the user interface element is received from a developer of the computer application.

13. The system of claim 11, wherein
the ancillary information for the user interface element is received from an entity independent from a developer of the computer application.

14. The system of claim 11, wherein
the searching is performed by a web service that is remote from the application.

15. The system of claim 11, wherein
the searching is performed local to the application.

16. A computer program product, comprising
a computer readable storage medium having program code stored therein,
the program code, which when executed by a computer hardware system, causes the computer hardware system to perform:
receiving, from a user of a user interface element in a computer application, a request for ancillary information associated with the user interface element;
searching, within a repository and based upon the request, for previously-stored ancillary information associated with the user interface element;
identifying, based upon no previously-stored ancillary information existing for the user interface element, a best match of other ancillary information; and
returning, to the user, the other ancillary information, wherein
the request includes contextual information associated with the user interface element.

17. The computer program product of claim 16, wherein
the ancillary information for the user interface element is received from a developer of the computer application.

18. The computer program product of claim 16, wherein
the ancillary information for the user interface element is received from an entity independent from a developer of the computer application.

19. The computer program product of claim 16, wherein
the searching is performed by a web service that is remote from the application.

20. The computer program product of claim 16, wherein
the searching is performed local to the application.

* * * * *